United States Patent [19]
Furuya et al.

[11] Patent Number: 5,272,463
[45] Date of Patent: Dec. 21, 1993

[54] DISPLAY DEVICE FOR VEHICLES

[75] Inventors: Yoshiyuki Furuya; Tadashi Iino; Kunimitsu Aoki, all of Shizuoka, Japan

[73] Assignee: Yazaki Corporation, Tokyo, Japan

[21] Appl. No.: 826,965

[22] Filed: Jan. 28, 1992

[30] Foreign Application Priority Data

Jan. 31, 1991 [JP] Japan .............. 3-008421[U]

[51] Int. Cl.[5] .............................................. B60Q 1/00
[52] U.S. Cl. ............................... 340/438; 340/461; 116/286; 116/298; 116/DIG. 36; 362/23; 362/28
[58] Field of Search .............. 340/438, 461; 116/286, 116/287, 288, 289, 290, 298, 291, 328, 327, 334, 335, DIG. 6, DIG. 36, 62.1; 362/23, 28

[56] References Cited

U.S. PATENT DOCUMENTS

| | | |
|---|---|---|
| 2,328,485 | 4/1943 | Ott ............................ 116/288 |
| 3,276,418 | 10/1966 | Harris ........................ 116/334 |
| 3,389,678 | 6/1968 | Fenwick ..................... 116/335 |
| 3,921,569 | 11/1975 | Miller et al. . |
| 4,054,105 | 10/1977 | Fegan . |
| 4,507,959 | 4/1985 | Brazener ................... 116/290 |
| 4,991,064 | 2/1991 | Clem ......................... 116/286 |

FOREIGN PATENT DOCUMENTS

| | | |
|---|---|---|
| 3142098 | 5/1983 | Fed. Rep. of Germany ...... 116/286 |
| 3237883 | 4/1984 | Fed. Rep. of Germany . |
| 3704574 | 8/1987 | Fed. Rep. of Germany . |
| 0041545 | 3/1977 | Japan ........................ 116/286 |
| 402080916 | 3/1990 | Japan ........................ 116/286 |

*Primary Examiner*—John K. Peng
*Assistant Examiner*—Nina Tong
*Attorney, Agent, or Firm*—Sughrue, Mion, Zinn, Macpeak & Seas

[57] ABSTRACT

This invention is to provide a display device for a vehicle with the pointer portion of light transmission type placed over characters etc, the value indicated by the pointer portion can be accurately read with high visibility. A display device for a vehicle comprises a dial and an indicating board laid on the dial. The dial includes a disk-shaped light transmitting portion, light transmitting characters and graduations outside the light transmitting portion, and an annular light transmitting portion outside the characters and the graduations The indicating board includes a light transmitting pointer's inner end portion and a light transmitting pointer's outer end portion which overlap the light transmitting portions of the dial, respectively, and an annular light transmitting portion which is laid over the characters and the graduations. The indicating board further includes a light transmitting pointer's outer end portion which is in alignment with the pointer's inner end portion and the pointer's outer end portion.

10 Claims, 3 Drawing Sheets

DISPLAY DEVICE FOR VEHICLES

BACKGROUND OF THE INVENTION

This invention relates to display devices for vehicles, and more particularly to a display device for a vehicle in which a disk-shaped dial is turned according to an amount of measurement, to indicate the latter.

DESCRIPTION OF THE PRIOR ART

In vehicles such as motor vehicles, a display device is extensively employed to allow the driver to observe amounts of measurement such as traveling speed and engine speed (hereinafter referred to as "a vehicle display device"). One example of the vehicle display device employs a disk-shaped dial which is turned according to an amount of measurement, to indicate the latter.

The conventional vehicle display device is as shown in FIGS. 4 and 5. A dial 1 made of a light diffusion board, which is fitted in an instrument casing arranged in the dash board (not shown) of a motor vehicle, has a substantially circular light transmitting portion 2 at the display position, and predetermined characters 3a and graduations 3b outside the light transmitting portion 2 which are also transparent. A central hole 4 is formed in the light transmitting portion 2 at the center. The rotary shaft 6 of an instrument unit 5 of cross coil type or the like, which is driven according to an amount of measurement, is inserted into the central hole 4 thus formed.

A disk-shaped indicating board 7 of a transparent plate such as an acrylic plate, which is equal in radius (R) to the light transmitting portion 2, is provided on the outer surface of the dial 1 in such a manner that it is fixedly mounted on the rotary shaft 6 of the instrument unit 5. The indicating board 7, as shown in FIG. 4, consists of a light shielding portion 9 and an pointer portion 8 which is elongated radially to transmit an irradiation light beam as described later. Therefore, as the instrument unit 5 is driven, the indicating board 7 and accordingly the pointer portion 8 is turned through the rotary shaft 6.

In the conventional vehicle display device, as shown in FIG. 5, light is applied from a light source (not shown) to the inner surface of the dial 1. The light thus applied diffuses in the dial 1, and passes through the characters 3a and the graduations 3b, so that the characters and the graduations can be visually read. At the same time, the light passes through the light transmitting portion 2 of the dial 1 and through the pointer portion 8 of the indicating board 7, so that the pointer portion 8 also can be visually read. The instrument unit 5 is driven according to an amount of measurement such as traveling speed, to turn the rotary shaft 6 and accordingly the indicating board 7. The graduation 3b indicated by the pointer portion 8 of the indicating board 7 is read for the amount of measurement.

In the above-described vehicle display device, the indicating board 7 is equal in radius (R) to the light transmitting portion 2 of the dial. Hence, the length of the pointer portion 8 of the indicating board 7 is limited. This makes it difficult to read the value indicated by the pointer portion 8.

This difficulty may be overcome by employment of a method in which the indicating board 7 is increased in diameter, that is, the pointer portion 8 is increased in length. However, the method is not practical for the following reasons. The diameter of light transmitting portion 2 of the dial 1 remains the same, and therefore only a portion of the pointer portion 8 is illuminated by the light passing through the light transmitting portion 2 of the dial 1; that is, the length of the illuminated part of the pointer portion is unchanged. In addition, the peripheral portion of the indicating board 7 having the increased diameter hides the characters 3a and the graduations 3b by overlapping them.

SUMMARY OF THE INVENTION

In view of the foregoing, an object of this invention is to provide a display device for a vehicle in which the pointer portion of light transmission type can be placed over the characters etc, and yet the value indicated by the pointer portion can be accurately read with high visibility.

The foregoing object of the invention has been achieved by the provision of a display device for a vehicle which comprises: a dial having a substantially disk-shaped light transmitting portion at the display position; light transmitting predetermined characters and graduations outside the light transmitting portion; a disk-shaped indicating board having a light transmitting pointer portion, the indicating board being set on the dial; a light source provided behind the dial and the indicating board, and an instrument unit for driving the indicating board according to an amount of measurement, in which, according to the invention, the indicating board includes an annular light transmitting portion which is laid over the characters and the graduations, the dial has an annular light transmitting portion outside the characters and graduations, and the indicating board further includes a light transmitting pointer's outer end portion which overlaps the light transmitting portion provided outside the characters and graduations in the dial.

In the display device, a pointer's light shielding portion is formed in the annular light transmitting portion of the indicating board in such a manner that the pointer's light shielding portion is in alignment with the pointer's outer end portion.

In the display device of the invention, the indicating board laid on the dial includes the annular light transmitting portion which is laid over the characters and the graduations, and the dial has the annular light transmitting portion outside the characters and the graduations. The indicating board further includes the light transmitting pointer's outer end portion which overlaps the annular light transmitting portion of the dial. That is, the pointer's inner end portion and the pointer's outer end portion, which are held brightened, are located inside and outside the portion of the dial, respectively, where the characters and the dial marks are formed. Hence, the value indicated by the pointer portion can be read with high accuracy.

The indicating board further includes the pointer's light shielding portion formed in the annular light transmitting portion in such a manner that it is in alignment with the pointer's inner end portion and the pointer's outer end portion. That is, the pointer's light shielding portion overlaps the character and the graduation which are held brightened. Hence, the value indicated by the pointer portion can be read with higher accuracy.

DETAILED DESCRIPTION OF THE PREFERRED EMBODIMENTS

Preferred embodiments of this invention will be described with reference to the accompanying drawings.

Figure 1:
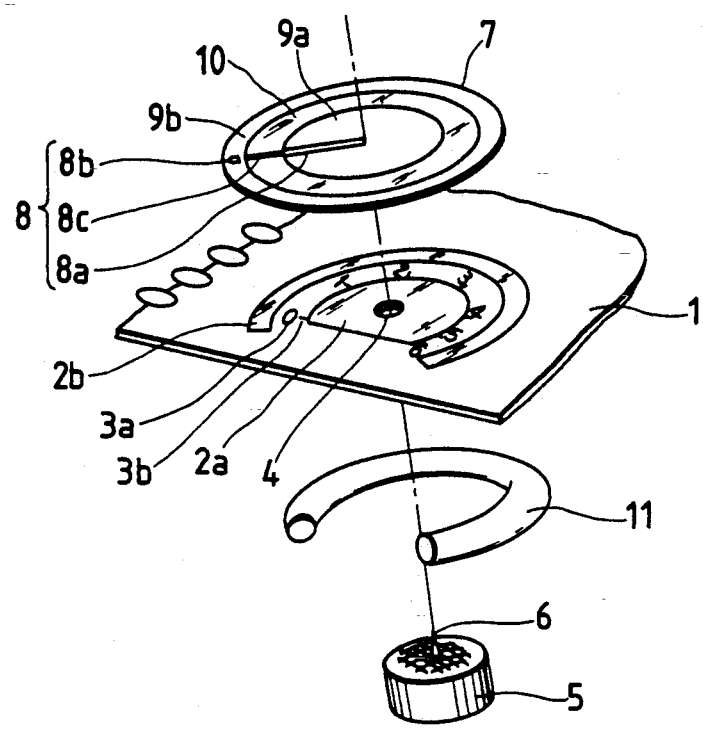
FIG. 1 is an exploded perspective view of one example of a vehicle display device according to this invention.
Figure 2:
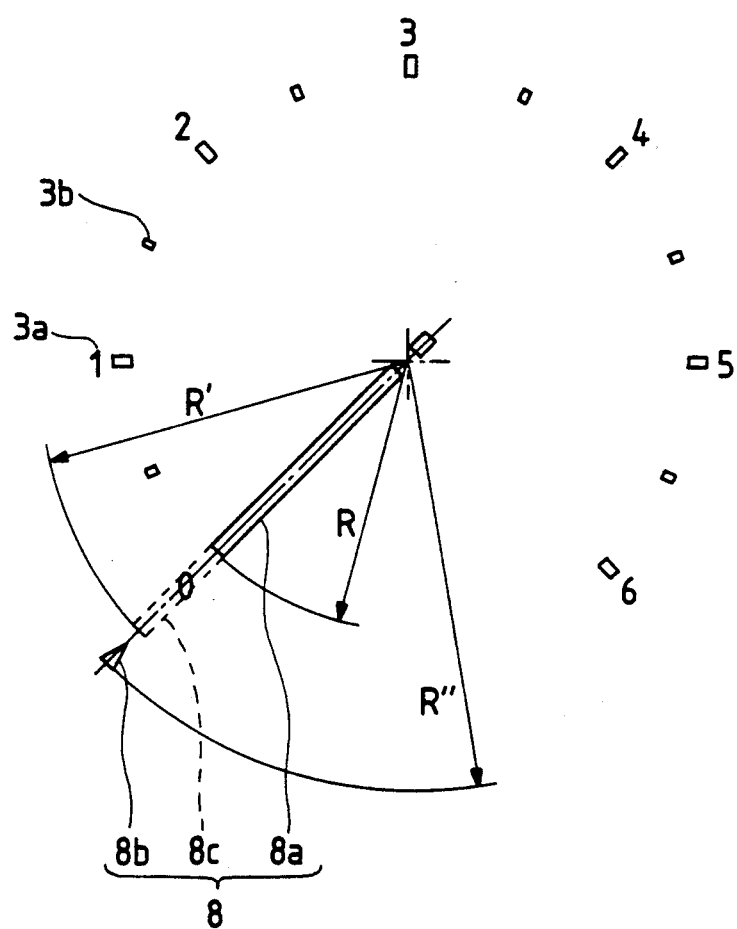
FIG. 2 is an explanatory diagram for a description of the transmission of light in the vehicle display device shown in FIG. 1.
Figure 4:
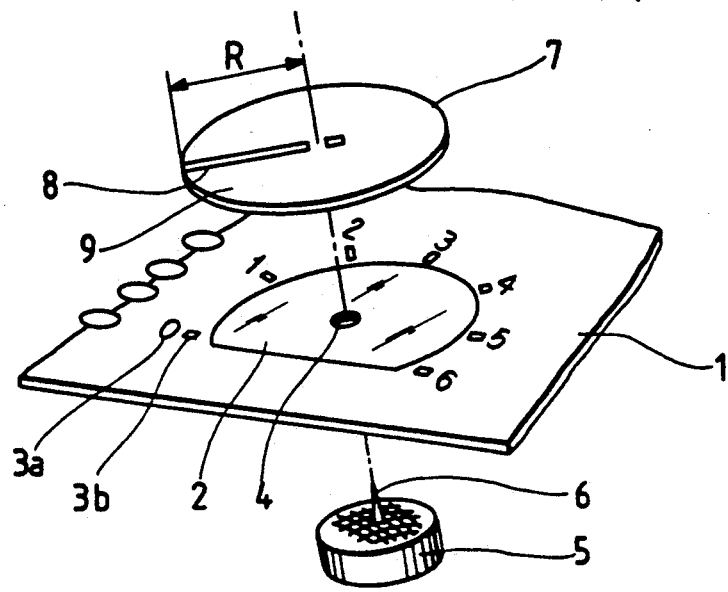
FIG. 4 is an exploded perspective view of a conventional vehicle display device.
Figure 5:
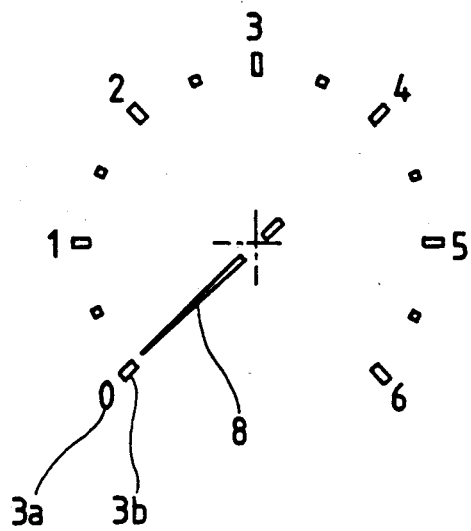
FIG. 5 is an explanatory diagram for a description of the transmission of light in the conventional vehicle display device.

FIGS. 1 and 2 shows an example of a vehicle display device which constitutes a first embodiment of the invention. A dial 1 made of a light diffusion board, which is fitted in an instrument casing arranged in the dash board (not shown) or the like of a motor vehicle, has a light transmitting portion 2a substantially circular at the display position, and predetermined characters 3a and graduations 3b outside the light transmitting portion 2a which are also transparent. The light diffusion board is made, for example, of a resin plate of white color. The dial 1 further includes an annular light transmitting portion 2b surrounding the characters 3a and the graduations 3b, A central hole 4 is formed in the light transmitting portion 2a at the center. The rotary shaft 6 of an instrument unit 5 of cross coil type or the like is inserted into the central hole 4 thus formed.

A disk-shaped indicating board 7 made of a transparent plate such as an acrylic plate, which is equal in radius (R) to the annular light transmitting portion 2b, is provided on the outer surface of the dial 1 (driver's side) in such a manner that it is fixedly mounted on the rotary shaft 6 of the instrument unit 5. The indicating board 7 includes a transparent light transmitting portion 10 which covers the characters 3a and the graduations 3b when the indicating board 7 is set in place on the dial 1, and light shielding portions 9a and 9b respectively inside and outside the light transmitting portion 10 which cover the light transmitting portions 2a and 2b, respectively, when the indicating board 7 is set on the dial 1 as was described above. The indicating board 7 further includes a pointer portion 8 extended radially. The parts of the pointer portion 8 which are in the light shielding portions 9a and 9b are transparent, and the remaining part of the pointer portion 8 which is in the light transmitting part is not transparent.

That is, the pointer portion 8, as shown in FIG. 2, consists of a light transmitting pointer's inner end portion 8a formed in the light shielding portion 9a of the indicating board 7, a light transmitting pointer's outer end portion 8b formed in the light shielding portion 9b, and a pointer's light shielding portion 8c formed in the light transmitting portion in such a manner that those portions 9a, 9b and 9c are in a line. The pointer inner end portion 8a has a length of R from the center of the indicating board 7. The pointer outer end portion 8b has a length of (R"-R') from the center of the indicating board 7. The pointer light shielding portion 8c has a length of (R'-R) from the center of the indicating board 7.

When light is applied to the dial, the pointer's inner end portion 8a and the pointer's outer end portion 8b are visible, transmitting light, while the pointer's light shielding portion 8c is invisible, shielding light. An annular light source 11 is provided behind the dial 1. When the light source 11 is turned on, the light from it diffuses in the dial 1 and passes through the light transmitting portions 2a and 2b and the characters 3a and the graduations 3b. The light further passes through the light transmitting portions 10, 8a and 8b of the indicating board 7.

The function of the vehicle display device thus designed will be described.

When the light source 11 is turned on to irradiate the dial 1 from behind, the output light of the light source diffuses in the dial 1, and passes through the light transmitting portions 2a and 2b and the characters 3a and the graduations 3b. The light passed through the light transmitting portions 2a and 2b is allowed to pass through the pointer's inner end portion 8a and the pointer's outer end portion 8b of the indicating board 7, so that those portions 8a and 8b are made visible. At the same time, the characters 3a and the graduations 3b, being made bright by the light passed through them, can be clearly seen through the light transmitting portion 10 of the indicating board 7.

In this case, the pointer's inner end portion 8a and the pointer's outer end portion 8b are inside and outside the light transmitting portion 10 of the indicating board 7, respectively; i.e., inside and outside the portion of the dial 1 where the characters 3a and the graduations 3b are formed, respectively. Hence, the value indicated by the pointer portion 8 can be clearly read with the aid of the pointer's inner end portion 8a and the pointer's outer end portion 8b which are. The pointer's light shielding portion 8c, a part of the pointer portion 8, which is formed in the light transmitting portion 10 of the indicating board 7 overlaps the character 3a and the graduation 3b. Hence, the value indicated by the pointer portion 8 can be more accurately read through the contrast of light and shade between the character 3a and graduation 3b and the pointer's light shielding portion 8c.

The instrument unit 5 is driven according to an amount of measurement such as vehicle speed, to turn the rotary shaft 6 thereby to turn the indicating board 7. The value indicated by the pointer portion 8 of the indicating board thus turned is read, to detect the amount of measurement.

As was described above, in the vehicle display device of the invention, the pointer's inner end portion 8a and the pointer's outer end portion 8b of the pointer portion 8, which are illuminated, are located inside and outside the portion of the dial 1, respectively, where the characters 3a and the graduations 3b are formed. Hence, the position of the pointer portion 8 (the value indicated thereby) can be accurately read. That is, the display device is considerably high in visibility. In addition, the pointer portion 8 is substantially long, which contributes to an improvement in grade of the display device. Furthermore, in the display device of the invention, the pointer's light shielding portion 8c overlaps the illuminated character 3a and graduation 3b, and therefore the value indicated by the pointer portion 8 can be read with higher accuracy.

Figure 3:
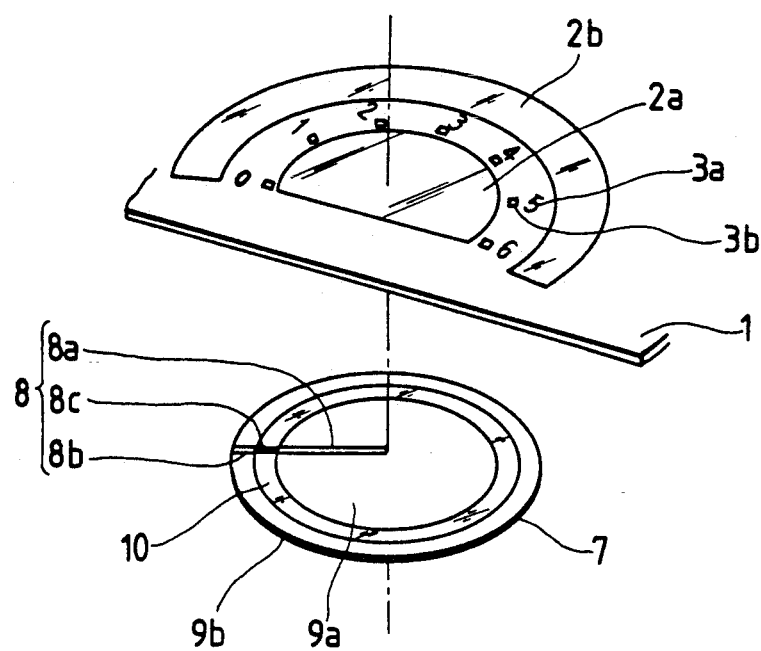
FIG. 3 is an exploded perspective view showing the arrangement of another example of the vehicle display device according to the invention.

FIG. 3 shows another example of the vehicle display device, a second embodiment of the invention. In the second embodiment, in contrast to the above-described first embodiment, the dial 1 is made of a transparent plate such as an acrylic plate, and the indicating board 7 is made of a light diffusion plate and is provided behind the dial 1. The other arrangement is the same as that in the first embodiment.

Similarly as in the first embodiment, the pointer's inner end portion 8a and the pointer's outer end portion 8b of the pointer portion 8, which are illuminated, are located inside and outside the portion of the indicating board 7, respectively, where the characters 3a and the graduations 3b are formed. Hence, the value indicated by the pointer portion 8 can be read clearly; that is, the display device is considerably high in visibility. Furthermore, since the pointer's light shielding portion 8c of the pointer portion 8 overlaps the character 3a and the graduation 3b, the value indicated by the pointer portion 8 can be read with higher accuracy.

As was described above, in the vehicle display device of the invention, the pointer's inner end portion and the pointer's outer end portion of the pointer portion, which are held brightened, are located inside and outside the portion of the indicating board, respectively, where the characters and the graduations are formed, and therefore the value indicated by the pointer portion can be read positively. That is, the display device is much improved in visibility.

In addition, since the pointer's light shielding portion of the pointer portion overlaps the character and the graduation, the value indicated by the pointer portion 8 can be read with higher accuracy.

What is claimed is:

1. A display device for a vehicle, comprising:
   a dial comprising a substantially disk-like shaped light transmitting portion at a display portion of said dial, light transmitting predetermined characters and graduations provided at an outer periphery of said light transmitting portion, and an annular light transmitting portion provided at an outer periphery of said characters and graduations; and
   a disk shaped indicating board comprising a light transmitting pointer portion, an annular light transmitting portion laid over said characters and said graduations, a light transmitting outer end portion of said light transmitting pointer portion overlapping said annular light transmitting portion provided at said outer periphery of said characters and graduations in said dial.

2. A display device as claimed in claim 1, wherein said disk shaped indicating board comprises a pointer light shielding portion formed in said annular light transmitting portion of said indicating board in such a manner that said pointer light shielding portion is in alignment with said light transmitting outer end portion.

3. A display device as claimed in claimed 2, wherein said light transmitting pointer portion, said light transmitting outer end portion and said pointer's light shielding portion are aligned with each other.

4. A display device as claimed in claim 1, wherein said dial is made of a light diffusion board.

5. A display device as claimed in claim 4, wherein said disk shaped indicating board is made of a transparent plate.

6. A display device as claimed in claim 5, wherein said indicating board is set on said dial.

7. A display device as claimed in claim 1, wherein said dial is made of a transparent plate and a light diffusion board.

8. A display device as claimed in claim 7, wherein said disk shaped indicating board is made of light diffusion board.

9. A display device as claimed in claim 8, wherein said indicating board is set under said dial.

10. A display device as claimed in claim 1, further comprising:
    a light source provide behind said dial and said indicating board, and
    an instrument unit for driving said indicating board according to an amount of measurement.

* * * * *